United States Patent
Kamiya et al.

(10) Patent No.: US 11,496,362 B2
(45) Date of Patent: Nov. 8, 2022

(54) USING LEGACY DEVICES IN A WEB-OF-THINGS

(71) Applicant: FUJITSU LIMITED, Kawasaki (JP)

(72) Inventors: Takuki Kamiya, San Jose, CA (US); Jane Yin, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 289 days.

(21) Appl. No.: 16/712,881

(22) Filed: Dec. 12, 2019

(65) Prior Publication Data

US 2020/0382366 A1    Dec. 3, 2020

Related U.S. Application Data

(60) Provisional application No. 62/855,777, filed on May 31, 2019.

(51) Int. Cl.
| | |
|---|---|
| *H04L 41/082* | (2022.01) |
| *G16Y 30/00* | (2020.01) |
| *G16Y 40/35* | (2020.01) |
| *H04L 67/565* | (2022.01) |

(52) U.S. Cl.
CPC ............ *H04L 41/082* (2013.01); *G16Y 30/00* (2020.01); *G16Y 40/35* (2020.01); *H04L 67/565* (2022.05)

(58) Field of Classification Search
CPC .... G16Y 30/00; G16Y 40/35; H04L 41/0233; H04L 41/082; H04L 41/0853; H04L 67/2823; H04W 4/70
See application file for complete search history.

(56) References Cited

U.S. PATENT DOCUMENTS

| | | | |
|---|---|---|---|
| 6,654,950 B1 * | 11/2003 | Barnishan | G06F 8/20 |
| | | | 717/136 |
| 7,735,001 B2 | 6/2010 | Kamiya | |
| 10,372,515 B1 * | 8/2019 | Stripe | G06F 9/546 |
| 2007/0083538 A1 * | 4/2007 | Roy | G06F 40/143 |
| 2014/0201418 A1 * | 7/2014 | Turner | H04L 67/02 |
| | | | 710/313 |
| 2018/0121320 A1 * | 5/2018 | Dolby | G06F 11/3608 |
| 2019/0026335 A1 * | 1/2019 | Gerweck | G06F 16/24578 |
| 2019/0208017 A1 * | 7/2019 | Ramsay | H04L 67/1095 |

OTHER PUBLICATIONS

Dennis Dawson "Nagasena Tutorial" Open EXI; Takuki Kamiya of Fujitsu Laboratories of America; http://openexi.sourceforge.net/tutorial/index.htm (retrieved on Mar. 30, 2015).

* cited by examiner

*Primary Examiner* — Jason D Recek
(74) *Attorney, Agent, or Firm* — Maschoff Brennan

(57) ABSTRACT

According to an aspect of an embodiment, a method may include obtaining a JavaScript Object Notation (JSON) schema that corresponds to legacy data. The legacy data may include a plurality of legacy data points corresponding to device features of a legacy device. The plurality of legacy data points may be delimited according to a legacy data format. The JSON schema may include a plurality of property definitions corresponding to the legacy data points. The JSON schema may additionally include a legacy object that describes the legacy data format in a manner that allows for processing of the legacy data using the JSON schema. The method may also include processing the legacy data using the plurality of property definitions and the legacy object included in the JSON schema in a manner that allows the legacy device to be used as a web-of-things Thing.

16 Claims, 8 Drawing Sheets

USING LEGACY DEVICES IN A WEB-OF-THINGS

CROSS-REFERENCE TO RELATED APPLICATION

This application claims the benefit of and priority to U.S. Provisional Patent App. No. 62/855,777, filed May 31, 2019. The 62/855,777 provisional application is incorporated herein by reference in its entirety.

FIELD

The embodiments discussed herein are related to using legacy devices in a Web-of-Things.

BACKGROUND

The Web-of-Things (WoT) includes software standards and formats that are configured to allow objects (referred to as "Things" in the WoT context) to be part of and/or interacted with through the World Wide Web ("Web"). The WoT often uses existing Web standards as the software standards to more seamlessly integrate the Things with the Web.

For example, Thing Descriptions are used to describe Thing data for WoT clients (e.g., other Things, software modules, etc.) in which the Thing Descriptions provide information to the WoT clients, e.g., based on the Thing data, as to how the clients may interact with (e.g., communicate with, control, etc.) the corresponding Things. In some cases, according to WoT standards, the Thing Descriptions are formatted according to one or more Web standards, for example, Representational State Transfer (REST), Hypertext Transfer Protocol (HTTP), and/or the JavaScript Object Notation ("JSON") format.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment, a method may include obtaining a JavaScript Object Notation (JSON) schema that corresponds to legacy data. The legacy data may include a plurality of legacy data points, each legacy data point of the plurality of legacy data points corresponding to a corresponding device feature of a plurality of device features of a legacy device. The plurality of legacy data points may be delimited according to a legacy data format that is different from a JSON format. The JSON schema may be formatted according to the JSON format. The JSON schema may include a plurality of property definitions, each property definition of the plurality of property definitions corresponding to a corresponding legacy data point of the plurality of legacy data points. The JSON schema may additionally include a legacy object that describes the legacy data format in a manner that allows for processing of the legacy data using the JSON schema. The method may also include processing the legacy data using the plurality of property definitions and the legacy object included in the JSON schema in a manner that allows the legacy device to be used as a web-of-things Thing.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
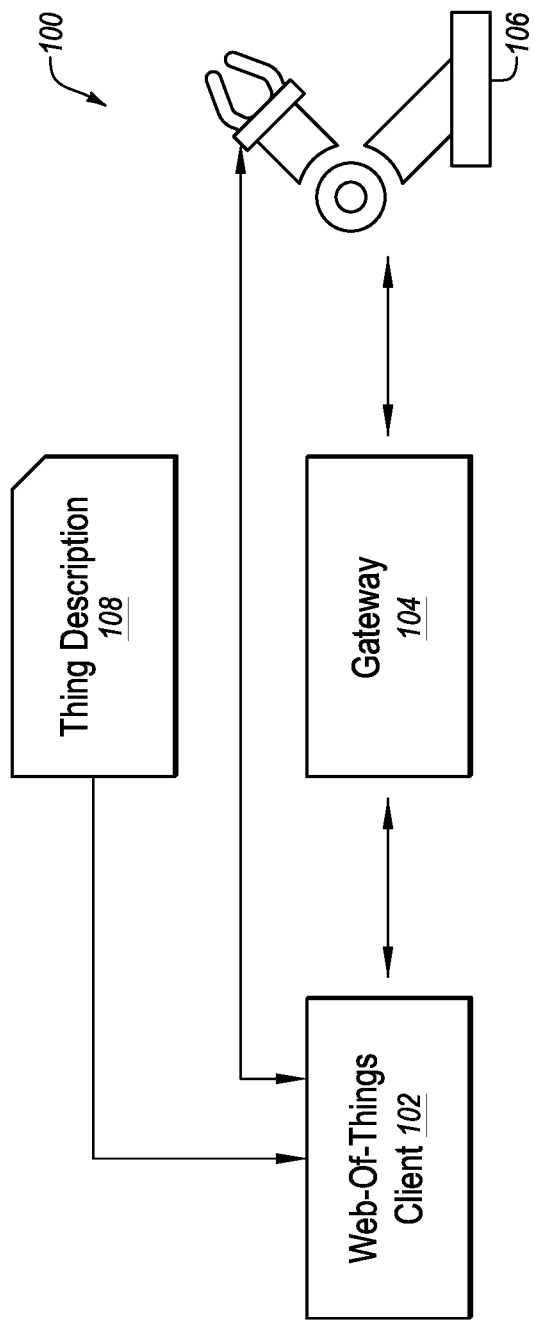
FIG. 1 is a block diagram of an example operating environment in which some embodiments may be implemented.

Thing Descriptions related to "Things" (e.g., both physical and virtual objects) of the Web-of-Things (WoT) describe Thing data (e.g., descriptive metadata) for corresponding Things. The Thing Description for a particular Thing may provide information for WoT clients (e.g., software, other Things, etc.) as to how the WoT clients may interact with (e.g., communicate with, control, etc.) the particular Thing. In some cases, according to WoT standards, the interactions between Things are carried out according to one or more Web standards, for example, Representational State Transfer (REST), Hypertext Transfer Protocol (HTTP), and/or the JavaScript Object Notation ("JSON") format. The use of Web standards in interactions may allow WoT clients and Things to exchange data between each other and/or control each other.

For example, in some instances, the Thing Descriptions support interoperability between Things and WoT clients by describing how Things manifest their Interaction Affordances (e.g., properties, actions and events) to WoT clients using Web technologies such as Hypermedia controls (links, forms, etc.) and JSON schema. The Thing Descriptions thus provide information as to how a WoT client may interact with Things. The use of Web technologies such as Hypermedia controls and JSON schema may drive use of the Things in a similar manner that Web Hypertext Markup Language (HTML) pages allow users to make choices while navigating the Web to drive Web applications through links and forms.

However, in some instances, legacy devices (e.g., both physical and virtual objects) may use legacy or proprietary data formats (e.g., comma-separated value (CSV), Type-Length-Value (TLV), Flat-file, or Abstract Syntax Notation One (ASN.1) Basic Encoding Rules (BER)). The legacy data formats used by the legacy devices may not be compatible with the Web Standards of the WoT (e.g., REST, HTTP, and JSON). In the present disclosure, legacy or proprietary data formats may be referred to generally as "legacy data formats" and data formatted according to one or more legacy data formats may be generally referred to as "legacy data."

According to one or more embodiments of the present disclosure, a JSON schema is obtained that corresponds to legacy data. The JSON schema may include property definitions, each of which may correspond to a data point of the legacy data. The JSON schema may also include a legacy object that may describe a legacy data format of the legacy data e.g., the way in which the legacy data points of the legacy data are delimited. The JSON schema may declaratively describe the legacy data format such that a legacy device (that uses the legacy data format) may be used as a WoT Thing. For example, legacy data of a legacy device (formatted in a non-WoT-compatible format) may be read and/or translated into a WoT-compatible format. As another example, information received (e.g., from a WoT client) may be formatted according to the legacy data format. In some cases the formatted information may be provided to the legacy device, e.g., as instructions. As such, the present disclosure may provide a mechanism that enables inclusion and use of legacy devices in the WoT that may otherwise be excluded from the WoT.

In some embodiments, a JSON schema (corresponding to legacy data of a legacy device) (e.g., including property definitions and a legacy object) may be included in a Thing Description such that WoT clients may be able to interact with the legacy device using the Thing Description. In these or other embodiments, a gateway may be configured to use the JSON schema to enable WoT clients to interact with legacy devices.

FIG. 1 depicts a block diagram of an example environment 100 in which one or more embodiments may be implemented. The environment 100 may include a WoT client 102, a gateway 104, a legacy device 106 and a Thing Description 108.

The WoT client 102 may include any suitable system, apparatus, module, or device configured to interact with WoT Things. In some embodiments, the WoT client may be a WoT Thing, a server, a desktop computer, a smartphone, a tablet computer, a computing system, a browser, a software application, and/or any other suitable hardware and/or software configured to interact with WoT things.

The legacy device 106 may include any applicable system, apparatus, module, or device that may operate as a WoT Thing. In some embodiments, the legacy device 106 may be a physical object or device. In these or other embodiments, the legacy device 106 may be a software application and/or a virtual object. In some embodiments, the legacy device 106 may have legacy data associated therewith that may be configured according to a legacy data format that is not compatible with a WoT format, e.g., the legacy data format may not be JSON.

In some embodiments, the legacy device 106 may be configured to expose the legacy data externally, e.g., through an electronic communications protocol e.g., any of the Institute of Electrical and Electronics Engineers (IEEE) 802 standards, and/or internet protocol (IP) standards. By exposing the legacy data, the legacy device 106 may provide the legacy data to external devices, e.g., the WoT client 102. Additionally or alternatively, by exposing the legacy data, the legacy device 106 may accept legacy data, and/or changes to the legacy data from external devices, e.g., the WoT client 102. For example, the legacy device 106 may receive instructions in the legacy data format and not be able to interpret instructions that are not according to the legacy data format. Additionally or alternatively, the legacy device 106 may provide outputs according to the legacy data format.

In some embodiments, the legacy data may include multiple data points. Each of the multiple data points may correspond to a feature of the legacy device 106. For example, if the legacy device is a display, e.g., a digital marquee, the legacy data may include data points corresponding to a display text, a duration, and a brightness. The multiple data points may be formatted according to the legacy data format. The legacy data format may define such things as how data points are delimited, how records are delimited, and/or data types of the data points.

In these or other embodiments, the legacy device 106 may have a Thing Description 108 associated therewith that may include a portion that may provide information that may allow the WoT client 102 to interact with the legacy device 106. For example, the Thing Description 108 may include a JSON schema including JSON object properties corresponding to the legacy data of the legacy device 106. In some embodiments, the JSON object properties may correspond to the features of the legacy device 106. Additionally or alternatively, the JSON schema may include a legacy object that may describe the legacy data format. In some embodiments, the JSON schema, including the legacy object may be configured according to a pattern of the legacy data format of the legacy data such that the legacy data may be used with the JSON schema. As such, the JSON schema may provide a mechanism that allows for the reading of or writing to the legacy data of the legacy device 106.

For example, in some embodiments, the legacy data format may be a CSV data format. A common pattern of the CSV data format is to have a record that may include multiple fields. The data values for the different fields of a particular record may be separated by a comma ",", and each record may be separated by a newline indicator "\n." For example, a CSV file with a particular record that includes a first field with a data value "F1," a second field with a data value "F2," and a third field with a data value "F3," may be organized as follows "F1, F2, F3\n." As such, in an instance in which the JSON schema is configured based on the CSV file format, the legacy object of the JSON schema may be configured to identify and differentiate between the different fields and records of CSV files based on the commas and newline indicators included in the CSV data.

The legacy object may be configured according to other patterns in other legacy data formats as well. For example, other patterns may include length-prefixed sequences for arrays and strings, field length and offset parameters, integer encoding variations (e.g., the number of bytes, signed/unsigned, text representations (decimal, hexadecimal, etc.), etc.) and floating point number representation specifications (e.g., IEEE 754 double precision or single precision, text representations, etc.).

In some embodiments, the gateway 104 may include any suitable system, apparatus, module, or device configured to provide a mechanism that allows for the conversion of the legacy data into a format that is compatible with Web standards. For example, the gateway 104 may use the JSON schema described herein to allow the WoT client 102 to interact with the legacy device 106. In some embodiments, the gateway 104 may include or access the Thing Description 108. In some embodiments, the gateway 104 may be separate from the WoT client 102, such as illustrated. Additionally or alternatively, the gateway 104 may be included with the WoT client 102 as a software routine or software application. In some embodiments, the gateway 104 may be configured to access the legacy data in a manner that is compatible with the JSON schema. In these or other embodiments, the gateway 104 may be configured to interact with (and/or allow the WoT client 102 to interact with) the legacy device 106 according to the JSON properties and the legacy object that may be included in the JSON schema.

Figure 2A:
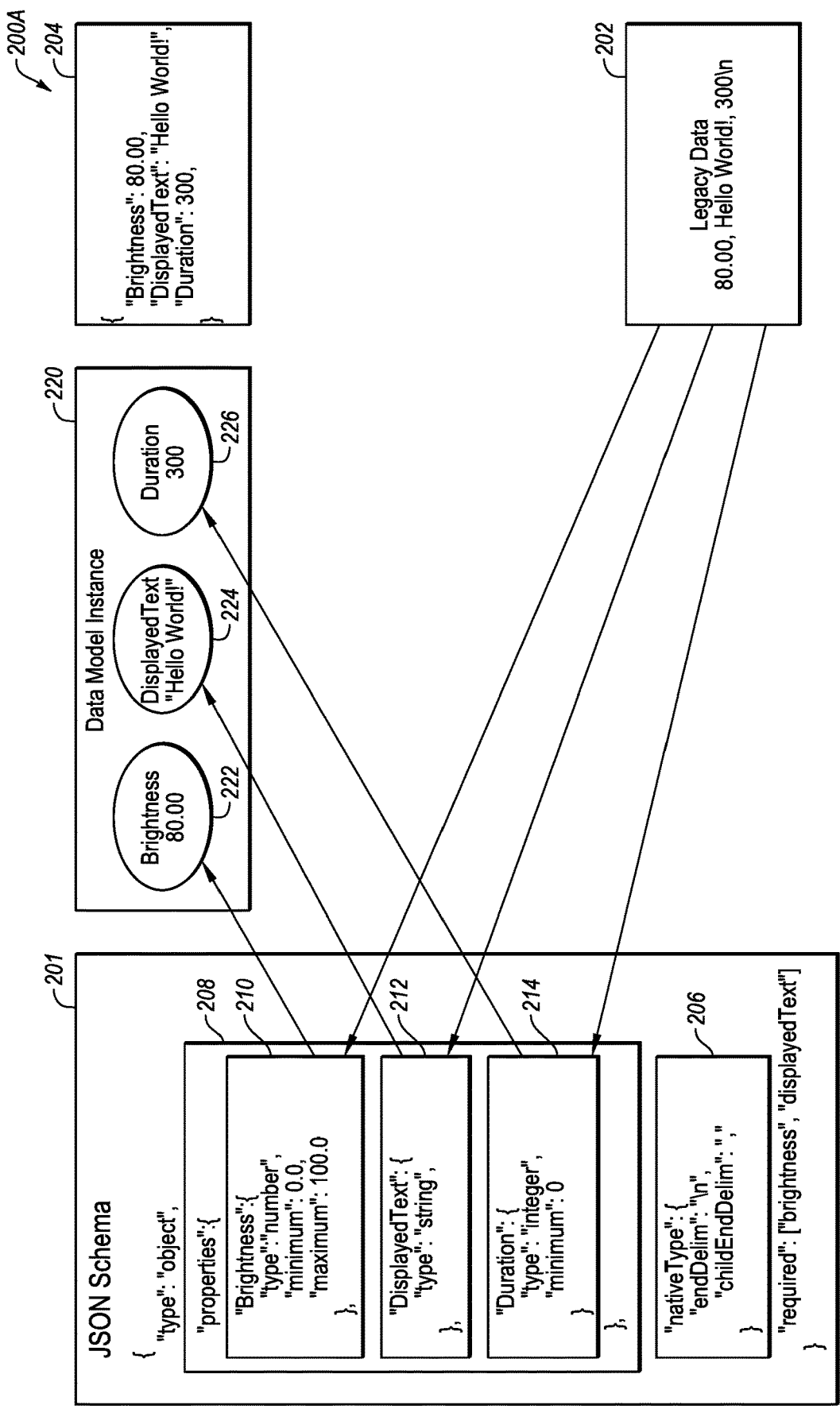
FIGS. 2A and 2B illustrate example processes that may be implemented in the operating environment of FIG. 1.

For example, FIG. 2A illustrates an example process 200A that may be implemented in the operating environment 100 of FIG. 1 according to at least one embodiment described in the present disclosure. In particular, FIG. 2A illustrates how legacy data 202 (e.g., of a legacy device, for example, the legacy device 106 of FIG. 1) may be read according to at least one embodiment described in the present disclosure.

In the particular example of the FIG. 2A, the legacy data 202 may be formatted according to a CSV data format. By comparison, if the legacy data 202 were formatted according to the JSON format, the legacy data 202 would be formatted as illustrated in block 204 of FIG. 2A.

A gateway, for example, the gateway 104 of FIG. 1 may use a JSON schema 201 to read the legacy data 202 formatted according to the CSV data format. Additionally or alternatively, the Thing Description 108 of FIG. 1 may include the JSON schema 201. The JSON schema 201, e.g., as included in the Thing Description 108 may be used by a WoT client (e.g., the WoT client 102 of FIG. 1) to read the legacy data 202. Whether the gateway 104 reads the legacy data 202 according to the JSON schema 201 or the JSON schema 201 allows for the WoT client 102 to read the legacy data 202, the legacy data 202 may be read, from the perspective of the WoT client 102, as if the legacy data 202 were formatted according to the JSON format as illustrated by block 204. In this way, the legacy device 106 may be interacted within a WoT as if it were a WoT Thing.

In the particular example of FIG. 2A, the legacy data 202 may represent a particular record of the legacy data 202 formatted according to the legacy data format. For example, the particular record of the legacy data 202 may be related to displaying particular text at a certain brightness for a certain duration of time. As such, the legacy data 202 may include data fields for each of the particular text, the certain brightness, and the certain duration.

In some embodiments, the JSON schema 201 may include a record portion 208 that corresponds to a record of the legacy data 202. The record portion 208 may include property definitions that may correspond to the different fields of the particular record of the legacy data 202. In some embodiments, the order of the property definitions of the record portion 208 may be ordered according to the order of legacy data 202. For example, the record portion 208 may include a "Brightness" definition 210 that corresponds to the first field of the legacy data 202. The "Brightness" definition 210 may be used to write the "Brightness" field 222. Additionally, the record portion 208 may include a "DisplayedText" definition 212 that corresponds to the second field of the legacy data 202. The "DisplayedText" definition 212 may be used to write the "DisplayedText" field 224. Additionally, the record portion 208 may include a "Duration" definition 214 that corresponds to the third field of the legacy data 202. The "Duration" definition 214 may be used to write the "Duration" field 226.

In some embodiments, according to the legacy data 202, a data model instance 220 may include field values for a "Brightness" field 222, a "DisplayedText" field 224, and a "Duration" field 226 of the particular record of the legacy data 202. In some embodiments, the record portion 208 of the JSON schema 201 may be used to correlate the fields of the legacy data 202 with the field values of the data model instance 220. Thus, as the legacy data 202 is read, the fields may be stored in corresponding fields of the data model instance 220.

In some embodiments, during the reading of data associated with the particular record, the gateway 104 or the WoT client 102 (e.g., according to the JSON schema 201) may be configured to iterate through the property definitions included in the record portion 208 according to the order of property definitions included in the JSON schema. For example, the order of property definitions in the JSON schema 201 may be first the "Brightness" definition 210, followed by the "DisplayedText" definition 212, followed by the "Duration" definition 214. As such, the gateway 104 (or the WoT client 102) may iterate from the "Brightness" 210, to the "DisplayedText" definition 212, to the "Duration" definition 214. In some embodiments, the gateway 104 or the WoT client 102 (e.g., according to the Thing Description 108) may be configured to iterate through the property definitions in a manner similar to that described in U.S. Pat. No. 7,735,001 issued on Jun. 8, 2010 and incorporated by reference in the present disclosure in its entirety.

In some embodiments, a legacy object 206 of the JSON schema 201 may provide information that indicates the differentiation between data fields and records according to the legacy data format (which, in this case, is the CSV format). Based on the iterating process and the organization of the record portion 208 and the legacy data 202, the legacy object 206 may be configured to allow for the reading of values of the legacy data 202. For example, in a scenario where data is read from the legacy data 202, (e.g., as illustrated in FIG. 2A) the legacy object 206 may be used to identify that "80.00" is the first field in the particular record of the legacy data 202. In particular, the legacy object 206 may be used to identify that "80.00" is the first field in the particular record of the legacy data 202 by recognizing the value of "endDelim" property and the value of the "childEndDelim" property in the legacy data 202. For example, "80.00" may be identified as the characters before a field-end delimiter ("childEndDelim"). In the particular example of FIG. 2A the record-end delimiter is the newline indicator "\n", and the field-end delimiter is a comma, as can be seen in the legacy object 206. The characters "80.00" of the legacy data 202 are the characters between a start of a record and a comma. Thus, it may be determined that the "80.00" is the first field in the record because "80.00" are the characters before the first comma ("childEndDelim"). To continue the example, the characters "Hello World!" may be identified as the second field of the legacy data 202 because the characters "Hello World!" are between the first and second commas ("childEndDelim"). And, to conclude the example, the characters "300" may be identified as the third field of the legacy data 202 because the characters "300" are between the second comma and the "\n". If the legacy data 202 continues with additional records, the additional records would be after the "\n" ("endDelim") and would be identified as being a new record.

Additionally or alternatively, in some embodiments, based on "80.00" being the first field in the legacy data 202 and the "Brightness" definition 210 being the first property definition of the record portion 208, the data value "80.00" may be correlated with the "Brightness" definition 210, and consequently with the "Brightness" field 222 of the data model instance 220. The gateway 104 (and/or the WoT client 102 e.g., using the Thing Description 108 and/or the JSON schema 201) may accordingly write the data value "80.00" to the "Brightness" field 222. Using the legacy object 206, the gateway 104 (and/or the WoT client 102) may parse through the rest of the legacy data 202 in a similar manner to read the legacy data 202 and write data values for the "DisplayedText" field 224 and the Duration field 226 of the particular record of the data model instance 220.

Therefore, the gateway 104 and/or the WoT client 102 may be configured to use the legacy object 206 in a manner that allows for the legacy data 202 to be used by the WoT client 102 in a manner that is compatible with Web standards, e.g., the JSON format. As such, the legacy device 106 may be included as a WoT Thing even though the legacy format of the legacy data 202 may not be compatible with the JSON format.

Figure 2B:
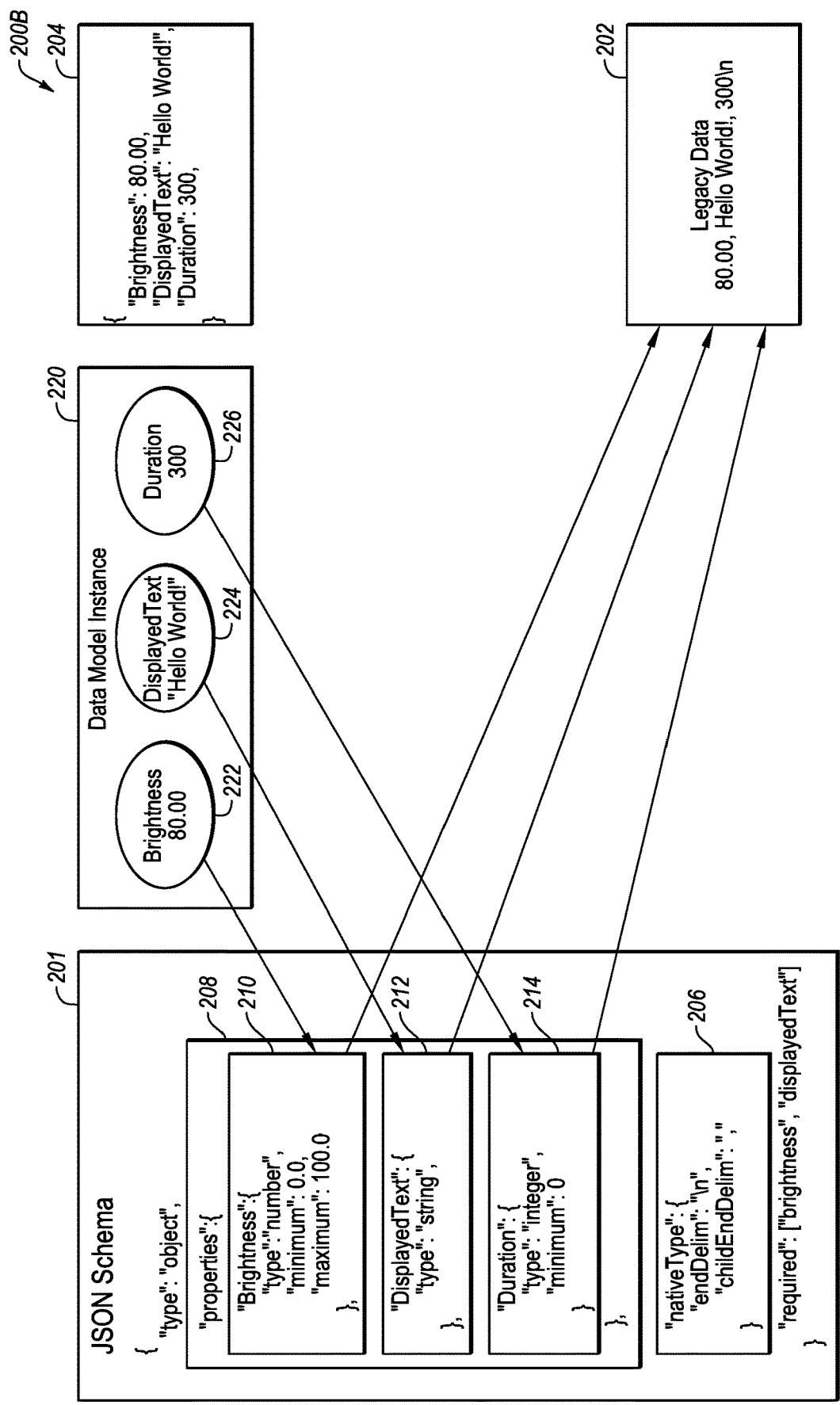

As another example, FIG. 2B illustrates an example process 200B that may be implemented in the operating environment 100 of FIG. 1 according to at least one embodiment described in the present disclosure. In particular, FIG. 2B illustrates how legacy data 202 (e.g., of a legacy device, for example, the legacy device 106 of FIG. 1) may be written and/or provided to the legacy device 106 according to at least one embodiment described in the present disclosure.

A gateway, for example, the gateway 104 of FIG. 1 may use a JSON schema 201 to write the legacy data 202 formatted according to the CSV data format. Additionally or alternatively, the Thing Description 108 of FIG. 1 may include the JSON schema 201. The JSON schema 201, e.g., as included in the Thing Description 108 may be used by a WoT client (e.g., the WoT client 102 of FIG. 1) to write the legacy data 202. Whether the gateway 104 writes the legacy data 202 according to the JSON schema 201 or the JSON schema 201 allows for the WoT client 102 to write the legacy data 202, the legacy data 202 may be written, from the perspective of the WoT client 102, as if the legacy data 202 were formatted according to the JSON format as illustrated by block 204. In this way, the legacy device 106 may be interacted with in a WoT as if it were a WoT Thing.

In some embodiments, during the writing of data associated with the particular record, the gateway 104 or the WoT client 102 (e.g., according to the JSON schema 201) may be configured to iterate through the property definitions included in the record portion 208 according to the order of property definitions included in the JSON schema 201.

In some embodiments, the legacy object 206 of the JSON schema 201 may provide information that indicates the differentiation between data fields and records according to the legacy data format (which, in this case, is the CSV format). Based on the iterating process and the organization of the record portion 208, the legacy object 206 may be configured to allow for the writing of values of the legacy data 202 according to the legacy data format. For example, in a scenario where data is written as the legacy data 202, (e.g., as illustrated in FIG. 2B) the legacy object 206 may be used to demarcate the "80.00" as the first field in the particular record of the legacy data 202. In particular, the legacy object 206 may be used demarcate the "80.00" as the first field in the particular record of the legacy data 202 by writing the value of the "childEndDelim" property in the legacy data 202. For example, according to the legacy object 206, the characters "80.00" may be written before a field-end delimiter ("chiledEndDelim"). In the particular example of FIG. 2B the record-end delimiter is the newline indicator "\n", and the field-end delimiter is a comma, as can be seen in the legacy object 206. Therefore, in writing the legacy data 202, the characters "80.00" would be written between a "\n" (not illustrated) and a comma. Thus, the "80.00" may be written as the first field in the record because the "80.00" would be written between the start of a record and the first comma ("childEndDelim"). To continue the example, the characters "Hello World!" may be written as the second field of the legacy data 202 because the characters "Hello World!" may be written between the first and second commas ("childEndDelim"). And, to conclude the example, the characters "300" may be written as the third field of the legacy data 202 because the characters "300" may be written between the second comma and the "\n" ("endDelim"). If the legacy data 202 continues with additional records, the additional records would be written after the "\n" ("endDelim") and would be written as being a new record.

Additionally or alternatively, in some embodiments, the legacy data 202 may be written from or based on the data model instance 220. For example, the value of the "Brightness" field 222 may be written first, e.g., between the start of a record and the first comma ("endChildDelim"). And the value of the "DisplayedText" field 224 may be written second, e.g., between the first comma ("endChildDelim") and the second comma ("endChildDelim"). As was stated above, the ordering of the values of the data model instance 220 in the legacy data 202 may be based on the ordering of the property definitions in the record portion 208.

Modifications, additions, or omissions may be made to the elements of FIG. 1, FIG. 2A, and FIG. 2B without departing from the scope of the present disclosure. For example, the specific instances of code and routines illustrated in FIGS. 2A and 2B are merely for explanatory purposes and are not meant to be limiting. Further, more or fewer elements may be included in FIG. 1. For instance, in some embodiments, communications between elements in FIG. 1 may be performed over a network that may include any communication network configured for communication of signals between any of the elements. The network may be wired or wireless. The network may have numerous configurations including a star configuration, a token ring configuration, or another suitable configuration. Furthermore, the network may include a local area network (LAN), a wireless personal area network (WPAN), a wireless LAN (WLAN), a wide area network (WAN) (e.g., the Internet), and/or other interconnected data paths across which multiple devices may communicate. In some embodiments, the network may include a peer-to-peer network. The network may also be coupled to or include portions of a telecommunications network that may enable communication of data in a variety of different communication protocols.

In some embodiments, the network includes or is configured to include a BLUETOOTH® communication network, a Z-Wave® communication network, an Insteon® communication network, an EnOcean® communication network, a Wi-Fi communication network, a ZigBee communication network, a HomePlug communication network, a Powerline Communication (PLC) communication network, a message queue telemetry transport (MQTT) communication network, an MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with respect to a WoT system.

Moreover, the separation of various elements in the embodiments described herein is not meant to indicate that the separation occurs in all embodiments. For example, as indicated above, the gateway 104 may be integrated with the WoT client 102 in some embodiments.

Figure 3:
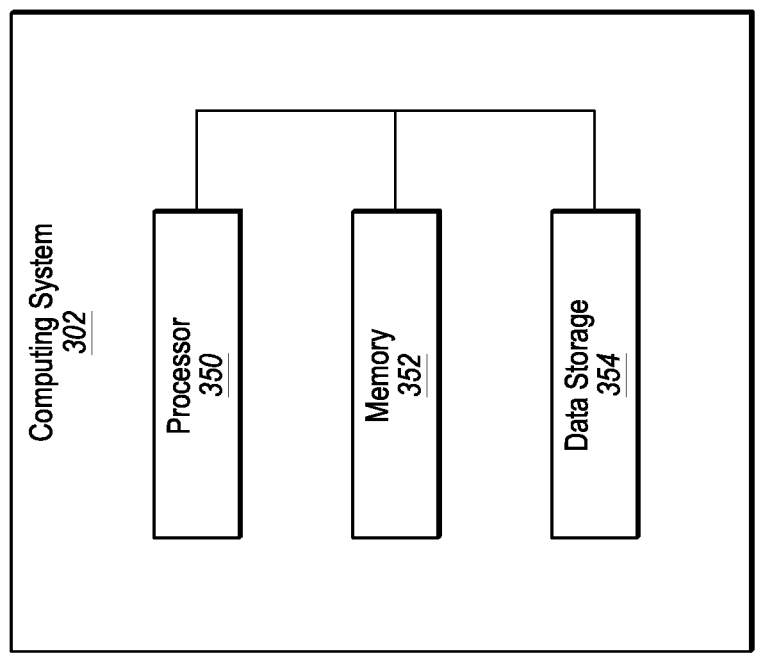
FIG. 3 is a block diagram of an example computing system.

FIG. 3 illustrates a block diagram of an example computing system 302, according to at least one embodiment of the present disclosure. The computing system 302 may be configured to implement or direct one or more operations associated with a device or module of the present disclosure (e.g., the WoT client 102, the gateway 104, and/or the legacy device 106 of FIG. 1). In these or other embodiments, the computing system 302 may be included in the WoT client 102, the gateway 104, and/or the legacy device 106 of FIG. 1. The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 350 to perform a certain operation or group of operations.

Modifications, additions, or omissions may be made to the computing system 302 without departing from the scope of the present disclosure. For example, in some embodiments, the computing system 302 may include any number of other components that may not be explicitly illustrated or described.

Figure 4:
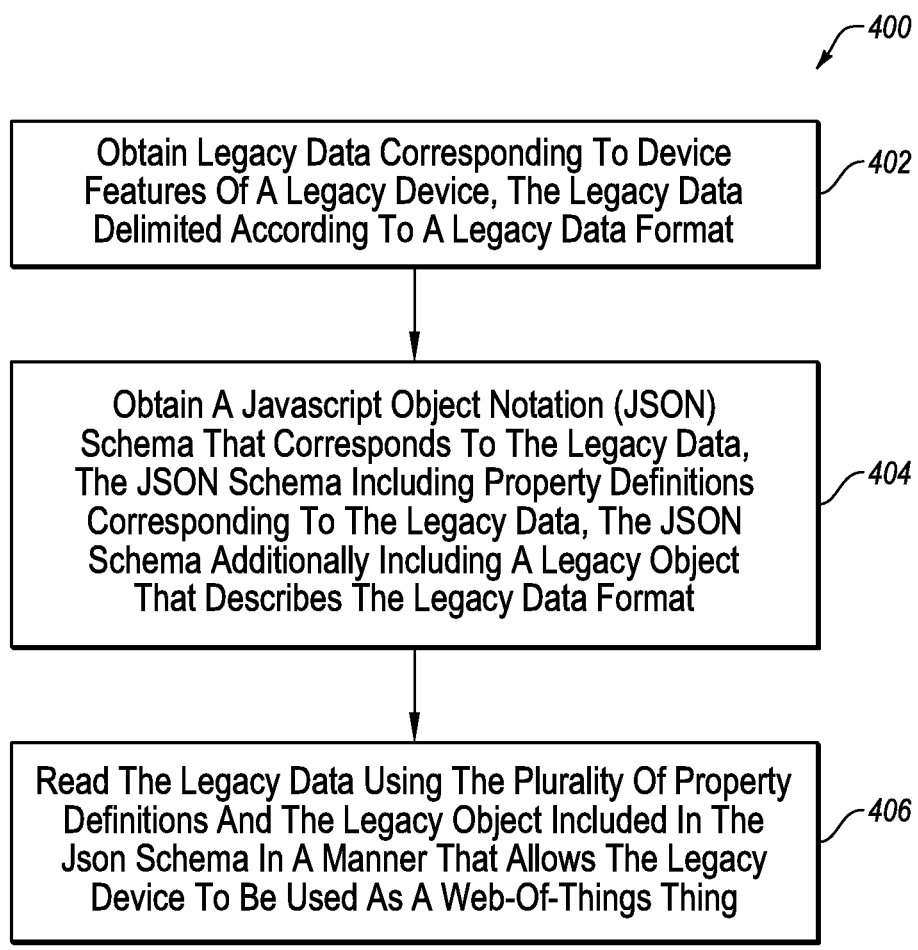
FIG. 4 is a flowchart of an example method of reading from legacy data.

FIG. 4 is a flowchart of an example method 400 of reading from legacy data, according to at least one embodiment described in the present disclosure. The method 400 may be performed by any suitable system, apparatus, or device. For example, one or more of the WoT client 102 and the gateway 104 of FIG. 1 or the computing system 302 of FIG. 3 (e.g., as directed by one or more software modules) may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

At block 410, legacy data corresponding to device features of a legacy device may be obtained. The legacy data may be delimited according to a legacy data format. The legacy data 202 of FIGS. 2A and 2B may be an example of the legacy data obtained at the block 410. The legacy device 106 of FIG. 1 may be an example of the legacy device which includes features to which the legacy data corresponds. CSV may be an example of the legacy device format.

At block 420, a javascript object notation (JSON) schema that corresponds to the legacy data may be obtained. The JSON schema may include property definitions corresponding to the legacy data. The JSON schema may additionally include a legacy object that describes the legacy data format. The JSON schema 201 of FIGS. 2A and 2B may be an example of the JSON schema obtained at the block 420. The property definitions of the record portion 208 (e.g., the "Brightness" definition 210, the "DisplayedText" definition 212, and the "Duration" definition 214) of FIGS. 2A and 2B may be examples of the property definitions of the block 420. The legacy object 206 of FIGS. 2A and 2B may be an example of the legacy object of the block 420.

At block 430, the legacy data may be read using the plurality of property definitions and the legacy object included in the JSON schema in a manner that allows the legacy device to be used as a web-of-things thing. For example, the legacy data may be read or interpreted according to the JSON schema. In particular, fields and records of the legacy data may be identified based on how the legacy is delimited and based on the legacy object. The legacy object may include a description of how the legacy data is delimited such that fields and records in the legacy data may be differentiated and identified. Additionally or alternatively, an interpretation of the fields may be given based on the property definitions. For example, the first property definition may correspond to a first field such that the first field may be interpreted as related to the first property.

In some embodiments, the method 400 may include writing data based on the read legacy data in another format. For example, the method 400 may include writing data based on the legacy data in a WoT-compatible format. For example, data based on the legacy data may be written in a JSON-compatible format, or as part of a data model, e.g., the data model instance 220 of FIGS. 2A and 2B.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 5:
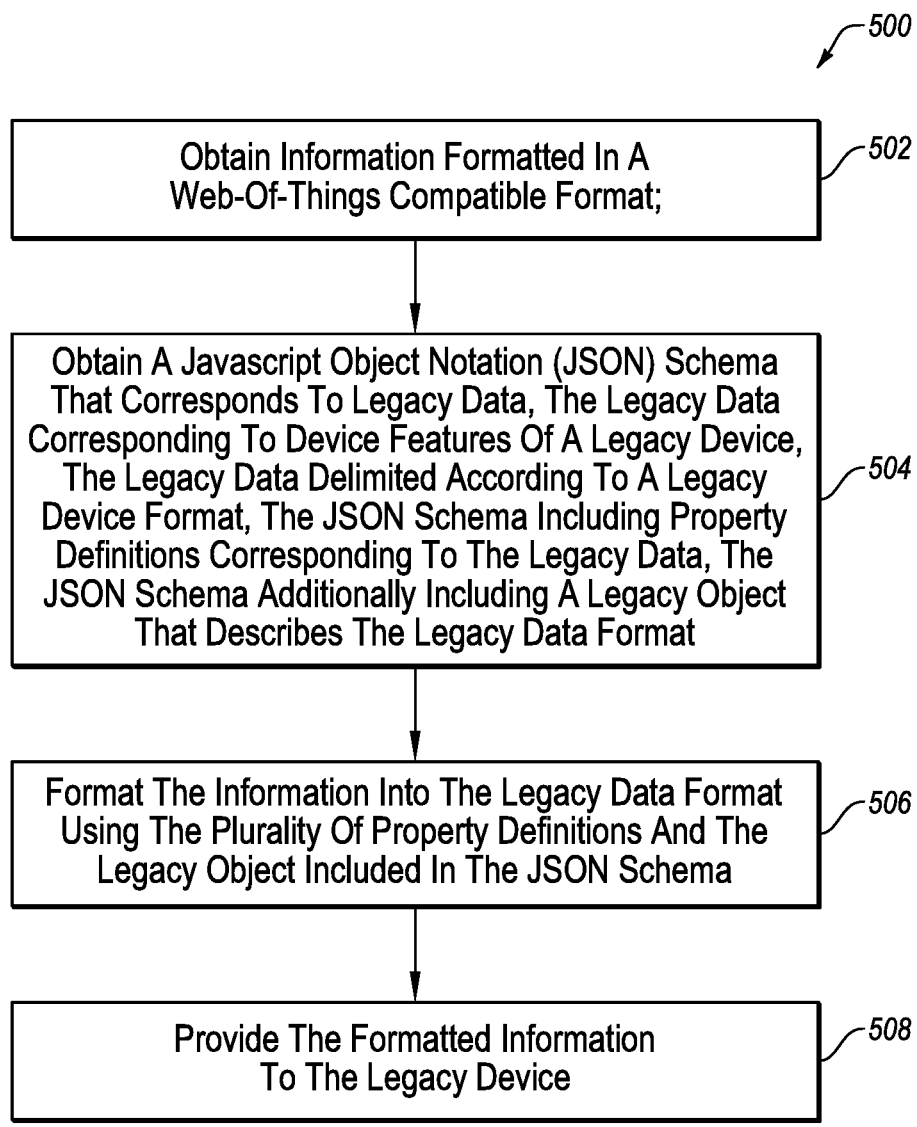
FIG. 5 is a flowchart of an example method of formatting information into a legacy data format.

FIG. 5 is a flowchart of an example method 500 of formatting information into a legacy data format according to at least one embodiment described in the present disclosure. The method 500 may be performed by any suitable system, apparatus, or device. For example, one or more of the WoT client 102 and the gateway 104 of FIG. 1 or the computing system 302 of FIG. 3 (e.g., as directed by one or more software modules) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

At block 502, information formatted in a web-of-things compatible format may be obtained. The data model instance 220 of FIGS. 2A and 2B may be an example of the information obtained at the block 502.

At block 504, a JSON schema that corresponds to legacy data may be obtained. The legacy data may correspond to device features of a legacy device. The legacy data may be delimited according to a legacy device format. The JSON schema may include property definitions corresponding to the legacy data. The JSON schema may additionally include a legacy object that describes the legacy data format. The JSON schema 201 of FIGS. 2A and 2B may be an example of the JSON schema obtained at the block 504. The legacy data 202 of FIGS. 2A and 2B may be an example of the legacy data to which the JSON schema of the block 504 corresponds. The legacy device 106 of FIG. 1 may be an example of the legacy device which includes features to which the legacy data corresponds. CSV may be an example of the legacy device format. The property definitions of the record portion 208 (e.g., the "Brightness" definition 210, the "DisplayedText" definition 212, and the "Duration" definition 214) of FIGS. 2A and 2B may be examples of the property definitions of the block 504. The legacy object 206 of FIGS. 2A and 2B may be an example of the legacy object of the block 504.

At block 506, the information (obtained at the block 502) may be formatted into the legacy data format using the plurality of property definitions and the legacy object included in the JSON schema (obtained at the block 504). In some embodiments, the method 500 may include writing data based on the information obtained at the block 502 into the legacy data format. For example, legacy data based on the information may be written in the legacy format, based on the JSON schema.

At block 508, the formatted information may be provided to the legacy device. For example, the formatted information may be provided to the legacy device as instructions for the legacy device to carry out.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 6:
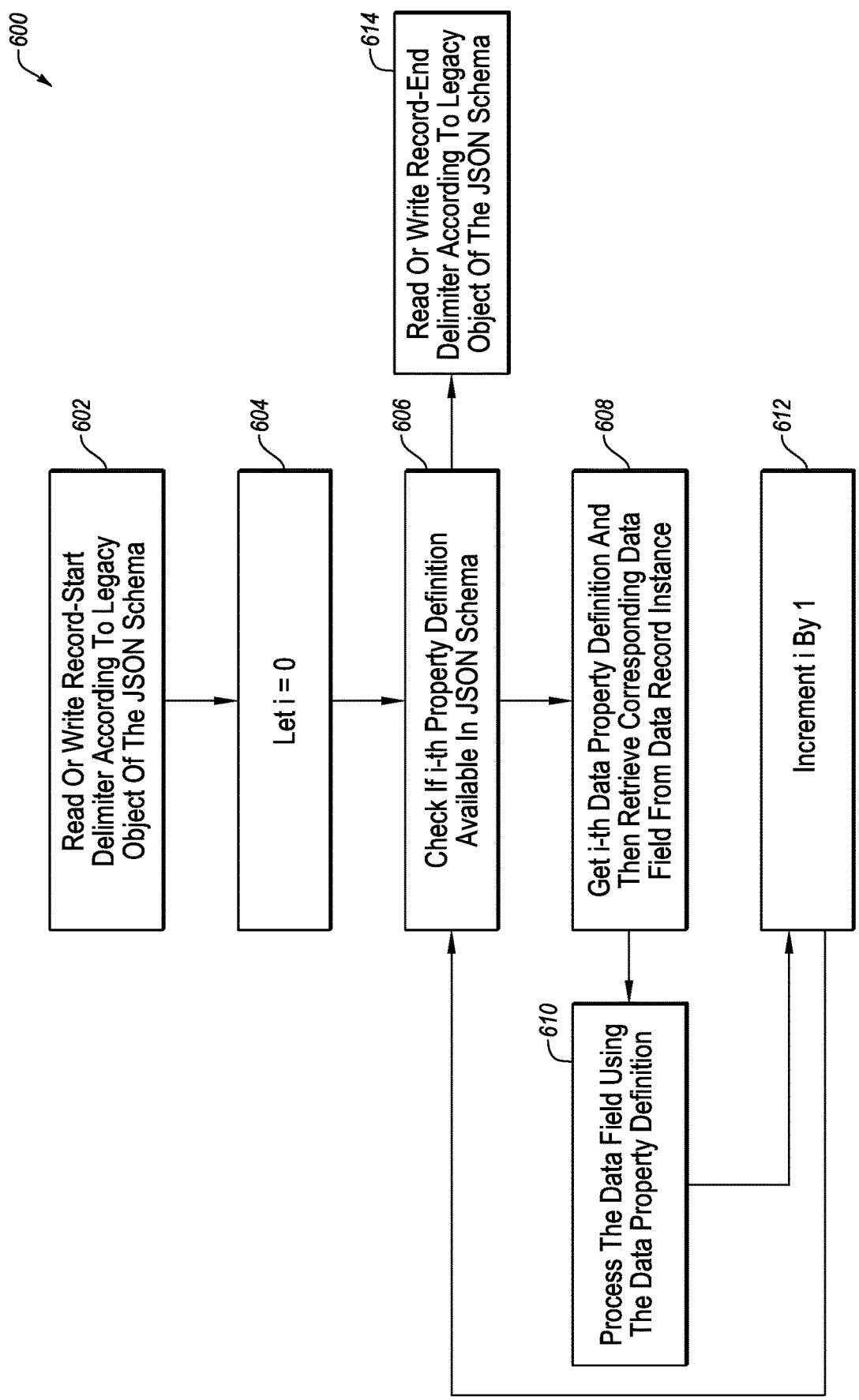
FIG. 6 is a flowchart of an example method of reading from or writing to legacy data.

FIG. 6 is a flowchart of an example method 600 of reading from or writing to legacy data according to at least one embodiment described in the present disclosure. The method 600 may be performed by any suitable system, apparatus, or device. For example, one or more of the WoT client 102 and the gateway 104 of FIG. 1 or the computing system 302 of FIG. 3 (e.g., as directed by one or more software modules) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation. Further, in the specific example of FIG. 6, the operations may be related to instances in which the legacy data is formatted according to a CSV data format. However, the principles involved may be applicable for other implementations related to other data formats.

The method 600 may begin at block 602, where a record-start delimiter may be read from the legacy data in instances in which the legacy data is being read. Alternatively, at block 602, the record-start delimiter may be written in the legacy data in instances in which the legacy data is being written. The record-start delimiter may delimit between records, for example, in the case where the legacy data format is JSON, the record-start delimiter may be a new line identifier "\n". The record-start delimiter may be identified for reading and/or writing based on a legacy object of a JSON schema, for example, the legacy object 206 of the JSON schema 201 of FIGS. 2A and 2B. The JSON schema may correspond to legacy data which may correspond to a legacy device.

At block 604, a field counter "i" may be set to zero "0." At block 606, it may be determined if an "ith" property definition is included in a particular record portion of the JSON schema. In the present example, when "i" is equal to "0", the first property definition listed in the record portion of the JSON schema may correspond to the first property definition. And, the second property definition may correspond to the "ith" property definition when "i" is equal to "1", the third property definition may correspond to the "ith" property definition when "i" is equal to "2" and so forth.

In response to an "ith" property definition being available at block 604, the method 600 may proceed to block 608. At block 608, the "ith" property definition may be obtained. For example, with respect to FIGS. 2A and 2B, in response to "i" being "0", the obtained "ith" property definition may be the first property definition, which may be e.g., the "Brightness" definition 210. Additionally, at block 608, the corresponding data value may be obtained from the applicable data record. For example, in instances in which the legacy data is being written to, the applicable data record from which the data value that corresponds to the "ith" property definition may be a data model instance that corresponds to the legacy device. For instance, with respect to FIGS. 2A and 2B, for a write operation to the legacy data 202, the applicable data record that includes the data to be written to the legacy data 202 may be the data model instance 220. And, in response to "i" being "0" the corresponding data value that may be obtained may be that included in the "Brightness" field 222 of the data model instance 220. As another example, with respect to FIGS. 2A and 2B, for a read operation from the legacy data 202, the applicable data record that includes the data to be read may be the legacy data 202. As such, in response to "i" being "0" the corresponding data value that may be obtained may be the first value "80.00" of the legacy data 202.

At block 610, a particular data field of the legacy data that corresponds to the obtained data value may be processed. In some embodiments, the processing may include writing to the particular data field or reading from the particular data field. In these or other embodiments, the processing may be performed according to one or more operations of a method 700 discussed below with respect to FIG. 7.

After block 610, "i" may be incremented by one at block 612. After block 612, the method 600 may return to block 606 and blocks 606, 608, 610, and 612 may be repeated until all the property definitions with respect to the particular record have been iterated through.

When all of the property definitions have been iterated through, it may be determined at block 606 that there are no property definitions available in the JSON schema and the method 600 may proceed from block 606 to block 614.

At block 614, a record-end delimiter may be read from the legacy data in instances in which the legacy data is being read. Alternatively, at block 614, the record-end delimiter may be written in the legacy data in instances in which the legacy data is being written to. The record-end delimiter may delimit between records, for example, if the legacy data format is JSON, the record-end delimiter may be a new line identifier "\n". The record-end delimiter may be identified for reading and/or writing based on a legacy object of a JSON schema, for example, the legacy object 206 of the JSON schema 201 of FIGS. 2A and 2B. The JSON schema may correspond to legacy data which may correspond to a legacy device.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 7:
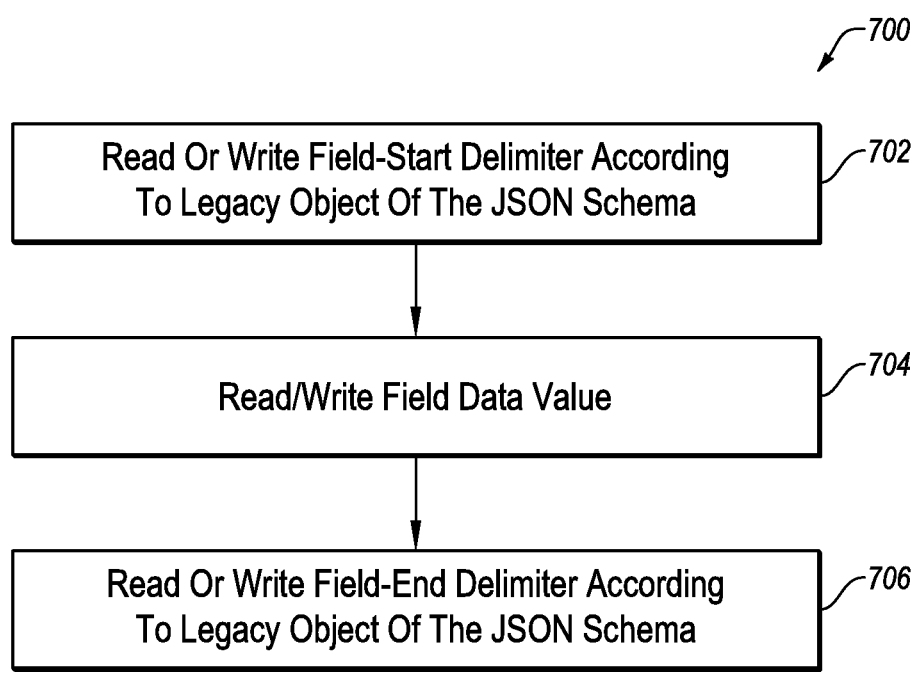
FIG. 7 is a flowchart of another example method of reading from or writing to legacy data, all according to at least one embodiment described in the present disclosure.

FIG. 7 is a flowchart of an example method 700 of reading from or writing to legacy data, according to at least one embodiment described in the present disclosure. The method 700 may be performed by any suitable system, apparatus, or device. For example, one or more of the WoT client 102 and the gateway 104 of FIG. 1 or the computing system 302 of FIG. 3 (e.g., as directed by one or more software modules) may perform one or more of the operations associated with the method 700. Although illustrated with discrete blocks, the steps and operations associated with one or more of the blocks of the method 700 may be divided into additional blocks, combined into fewer blocks, or eliminated, depending on the particular implementation. Further, in the specific example of FIG. 7, the operations may be related to instances in which the legacy data is formatted according to a CSV data format. However, the principles involved may be applicable for other implementations related to other data formats.

The method 700 may begin at block 702, where a field-start delimiter may be read from the legacy data in instances in which the legacy data is being read. Alternatively, at block 702, the field-start delimiter may be written in the legacy data in instances in which the legacy data is being written to. The field-start delimiter may delimit between fields of a record, for example, in the case where the legacy data format is JSON, the field-start delimiter may be a comma ",". The field-start delimiter may be identified for reading and/or writing based on a legacy object of a JSON schema, for example, the legacy object 206 of the JSON schema 201 of FIGS. 2A and 2B. The JSON schema may correspond to legacy data which may correspond to a legacy device.

At block 704, a data value may be read from or written to the data field of the legacy data that follows the field-start delimiter. As indicated above, the data value may correspond to the data field that is identified at block 608 of FIG. 6.

At block 706, a field-end delimiter may be read from the legacy data in instances in which the legacy data is being read. Alternatively, at block 706, the field-end delimiter may be written in the legacy data in instances in which the legacy data is being written to. The field-end delimiter may delimit between records, for example, in cases where the legacy data format is JSON, the field-end delimiter may be a comma ",". The field-end delimiter may be identified for reading and/or writing based on a legacy object of a JSON schema, for example, the legacy object 206 of the JSON schema 201 of FIGS. 2A and 2B. The JSON schema may correspond to legacy data which may correspond to a legacy device.

Modifications, additions, or omissions may be made to the method 700 without departing from the scope of the present disclosure. For example, the operations of method 700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer (e.g., the processor 350 of FIG. 3) including various computer hardware or software modules, as discussed in greater detail below. Further, as indicated above, embodiments described in the present disclosure may be implemented using computer-readable media (e.g., the memory 352 or data storage 354 of FIG. 3) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    obtaining a JavaScript Object Notation (JSON) schema that corresponds to legacy data, the legacy data including a plurality of legacy data points, each legacy data point of the plurality of legacy data points corresponding to a corresponding device feature of a plurality of device features of a legacy device, the plurality of legacy data points delimited according to a legacy data format that is different from a JSON format, the JSON schema being formatted according to the JSON format, the JSON schema including a plurality of property definitions, each respective property definition of the plurality of property definitions corresponding to a corresponding legacy data point of the plurality of legacy data points, the JSON schema additionally including a legacy object that describes a differentiation between different legacy data points according to the legacy data format in a manner that allows for processing of the legacy data using the JSON schema; and
    processing the legacy data using the plurality of property definitions and the legacy object included in the JSON schema in a manner that allows the legacy device to be used as a web-of-things Thing, the processing including identifying and differentiating between different legacy data points based on the legacy object and including formatting corresponding information of the identified legacy data points into a web-of-things compatible format, the formatting being based on the respective property definitions that correspond to identified legacy data points.

2. The method of claim 1, further comprising obtaining the legacy data from the legacy device and wherein processing the legacy data includes reading the legacy data.

3. The method of claim 1, further comprising:
    obtaining information formatted in a web-of-things-compatible format;
    formatting the obtained information into the legacy data format using the plurality of property definitions and the legacy object included in the JSON schema; and
    providing the formatted information to the legacy device.

4. The method of claim 1, wherein the legacy device includes a physical device or a virtual device.

5. The method of claim 1, wherein the plurality of legacy data points of legacy data is arranged according to a legacy data order and wherein the plurality of properties of the JSON schema is arranged according to the legacy data order.

6. At least one non-transitory computer-readable media configured to store one or more instructions that in response to being executed by at least one processor cause a system to perform operations, the operations comprising:
    obtaining a JavaScript Object Notation (JSON) schema that corresponds to legacy data, the legacy data including a plurality of legacy data points, each legacy data point of the plurality of legacy data points corresponding to a corresponding device feature of a plurality of device features of a legacy device, the plurality of legacy data points delimited according to a legacy data format that is different from a JSON format, the JSON schema being formatted according to the JSON format, the JSON schema including a plurality of property definitions, each property definition of the plurality of property definitions corresponding to a corresponding legacy data point of the plurality of legacy data points, the plurality of properties of the JSON schema being arranged in the JSON schema according to an arrangement order of the plurality of legacy data points in the legacy data, the JSON schema additionally including a legacy object that describes the legacy data format in a manner that allows for processing of the legacy data using the JSON schema; and
    processing the legacy data using the plurality of property definitions and the legacy object included in the JSON schema in a manner that allows the legacy device to be used as a web-of-things Thing.

7. The at least one non-transitory computer-readable media of claim 6, wherein the operations further comprise obtaining the legacy data from the legacy device and wherein processing the legacy data includes reading the legacy data.

8. The at least one non-transitory computer-readable media of claim 6, wherein the operations further comprise obtaining the legacy data from the legacy device and wherein processing the legacy data includes formatting information regarding one or more legacy data points of the plurality of legacy data points in a web-of-things-compatible format.

9. The at least one non-transitory computer-readable media of claim 6, wherein the operations further comprise obtaining information formatted in a web-of-things-compatible format, wherein processing the legacy data includes formatting the information into the legacy data format using the plurality of property definitions and the legacy object included in the JSON schema, and wherein the operations further comprise providing the formatted information to the legacy device.

10. The at least one non-transitory computer-readable media of claim 6, wherein the legacy device includes a physical device or a virtual device.

11. The at least one non-transitory computer-readable media of claim 6, wherein the legacy data object describes how the plurality of legacy data points is delimited.

12. A system comprising:
one or more processors; and
one or more computer-readable media configured to store one or more instructions that in response to being executed by the one or more processors cause the system to perform operations, the operations comprising:
obtaining a JavaScript Object Notation (JSON) schema that corresponds to legacy data, the legacy data including a plurality of legacy data points, each legacy data point of the plurality of legacy data points corresponding to a corresponding device feature of a plurality of device features of a legacy device, the plurality of legacy data points delimited according to a legacy data format that is different from a JSON format, the JSON schema being formatted according to the JSON format, the JSON schema including a plurality of property definitions, each property definition of the plurality of property definitions corresponding to a corresponding legacy data point of the plurality of legacy data points, the plurality of properties of the JSON schema being arranged in the JSON schema according to an arrangement order of the plurality of legacy data points in the legacy data, the JSON schema additionally including a legacy object that describes the legacy data format in a manner that allows for processing of the legacy data using the JSON schema; and
processing the legacy data using the plurality of property definitions and the legacy object included in the JSON schema in a manner that allows the legacy device to be used as a web-of-things Thing.

13. The system of claim 12, wherein the operations further comprise obtaining the legacy data from the legacy device and wherein processing the legacy data includes reading the legacy data.

14. The system of claim 12, wherein the operations further comprise obtaining the legacy data from the legacy device and wherein processing the legacy data includes formatting information regarding one or more legacy data points of the plurality of legacy data points in a web-of-things-compatible format.

15. The system of claim 12, wherein the operations further comprise obtaining information formatted in a web-of-things-compatible format, wherein processing the legacy data includes formatting the information into the legacy data format using the plurality of property definitions and the legacy object included in the JSON schema, and wherein the operations further comprise providing the formatted information to the legacy device.

16. The system of claim 12, wherein the legacy data object describes how the legacy data points of the plurality of legacy data points are delimited.

* * * * *